US012718038B2

(12) United States Patent
Bergeron et al.

(10) Patent No.: US 12,718,038 B2
(45) **Date of Patent: *Aug. 25, 2026**

(54) AUGMENTED REALITY INFORMATION DISPLAY AND INTERACTION VIA NFC BASED AUTHENTICATION

(71) Applicant: Capital One Services, LLC, McLean, VA (US)

(72) Inventors: George Bergeron, Falls Church, VA (US); Bryant Yee, Washington, DC (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,718

(22) Filed: Jun. 20, 2024

(65) Prior Publication Data

US 2024/0338538 A1 Oct. 10, 2024

Related U.S. Application Data

(63) Continuation of application No. 18/125,273, filed on Mar. 23, 2023, now Pat. No. 12,050,957, which is a
(Continued)

(51) Int. Cl.
*G06K 7/10* (2006.01)
*G06F 3/14* (2006.01)
(Continued)

(52) U.S. Cl.
CPC ........... *G06K 7/10297* (2013.01); *G06F 3/14* (2013.01); *G06F 21/6245* (2013.01);
(Continued)

(58) Field of Classification Search
CPC .. G06K 7/10297; G06K 7/10118; G06F 3/14; G06F 21/6245; G06F 3/0484; H04L 9/0861; H04L 9/3226
(Continued)

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
CN 110476189 A 11/2019
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Paultep Savusdiphol
(74) *Attorney, Agent, or Firm* — KDW Firm PLLC

(57) ABSTRACT

Various embodiments are generally directed to improving card security by providing a user a contactless card with no sensitive card information, such as card number, card verification value, and expiration date, printed thereon, and displaying the sensitive card information relative to the card in augmented reality (AR) based on successful NFC-based user authentication. According to examples, the NFC-based user authentication may be performed by one-tapping or single tapping the contactless card to user mobile device. One or more portions of the sensitive card information may
(Continued)

be obfuscated to further enhance card security. Moreover, the user can interact with AR elements including the sensitive card information to perform various actions.

19 Claims, 11 Drawing Sheets

Related U.S. Application Data continuation of application No. 17/342,969, filed on Jun. 9, 2021, now Pat. No. 11,636,276, which is a continuation of application No. 16/990,300, filed on Aug. 11, 2020, now Pat. No. 11,062,098.

(51) Int. Cl.
*G06F 21/62* (2013.01)
*G06Q 40/02* (2023.01)
*H04L 9/08* (2006.01)
*H04L 9/32* (2006.01)
*G06F 3/0484* (2022.01)

(52) U.S. Cl.
CPC ........... *G06Q 40/02* (2013.01); *H04L 9/0861* (2013.01); *H04L 9/3226* (2013.01); *G06F 3/0484* (2013.01)

(58) Field of Classification Search
USPC ................................................. 235/451, 492
See application file for complete search history.

(56) References Cited

U.S. PATENT DOCUMENTS 6,199,114 B1 3/2001 White
6,324,271 B1 11/2001 Sawyer
6,367,011 B1 4/2002 Lee
6,572,015 B1 6/2003 Norton
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,477,852 B1 * 10/2016 Neale .................... G06K 1/128
9,501,776 B2 11/2016 Martin
9,710,744 B2 7/2017 Wurmfeld
9,836,736 B1 * 12/2017 Neale .................. G06Q 20/355
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,078,867 B1 * 9/2018 Chan ..................... G06Q 40/02
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,541,995 B1 1/2020 Mossler et al.
10,546,444 B2 1/2020 Osborn
10,581,611 B1 3/2020 Osborn
10,664,830 B1 5/2020 Rule
10,685,349 B2 6/2020 Brickell
10,713,645 B1 * 7/2020 Neale .................... G07F 7/0866
10,797,882 B2 10/2020 Rule
10,880,741 B2 12/2020 Zarakas
10,909,525 B1 2/2021 Dhodapkar
10,963,865 B1 * 3/2021 Rule ....................... G07F 7/125
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2003/0220876 A1 11/2003 Burger
2005/0156026 A1 7/2005 Ghosh
2005/0228997 A1 10/2005 Bicker
2005/0269402 A1 12/2005 Spitzer
2007/0276765 A1 11/2007 Hazel
2008/0082452 A1 4/2008 Wankmueller
2008/0099552 A1 5/2008 Grillion
2009/0143104 A1 6/2009 Loh
2009/0235339 A1 9/2009 Mennes
2009/0282264 A1 11/2009 Amiel
2011/0113245 A1 5/2011 Varadarajan
2011/0155801 A1 6/2011 Rowberry
2012/0143703 A1 6/2012 Wall
2013/0030997 A1 1/2013 Spodak

(56) References Cited

U.S. PATENT DOCUMENTS

2013/0072115 A1* 3/2013 Dobyns .................... H04B 5/26
455/41.1
2013/0146657 A1 6/2013 Graef
2013/0211937 A1 8/2013 Elbirt
2013/0311363 A1 11/2013 Ramaci
2014/0074637 A1 3/2014 Hammad
2014/0074655 A1 3/2014 Lim
2014/0081785 A1 3/2014 Valadas Preto
2014/0365377 A1 12/2014 Salama
2015/0032635 A1 1/2015 Guise
2015/0073983 A1 3/2015 Bartenstein
2015/0113271 A1 4/2015 Jooste
2015/0134513 A1 5/2015 Olson
2015/0199673 A1 7/2015 Savolainen
2015/0199863 A1 7/2015 Scoggins
2015/0254637 A1 9/2015 Yang
2015/0317295 A1 11/2015 Sherry
2016/0078247 A1 3/2016 Tucker et al.
2016/0078430 A1 3/2016 Douglas
2016/0189143 A1 6/2016 Koeppel
2016/0253651 A1 9/2016 Park
2016/0277383 A1 9/2016 Guyomarc'h
2016/0307189 A1 10/2016 Zarakas
2016/0314472 A1 10/2016 Ashfield
2016/0379217 A1 12/2016 Hammad
2017/0017957 A1 1/2017 Radu
2017/0039566 A1 2/2017 Schipperheijn
2017/0068950 A1 3/2017 Kwon
2017/0330173 A1 11/2017 Woo
2018/0039987 A1 2/2018 Molino
2018/0150899 A1* 5/2018 Waldron ................. G06F 3/017
2018/0174134 A1* 6/2018 Carpenter ............ G06Q 20/354
2018/0268132 A1 9/2018 Buer
2018/0300716 A1 10/2018 Carlson
2019/0172055 A1 6/2019 Hale
2019/0303945 A1 10/2019 Mitra
2020/0184462 A1 6/2020 Rule et al.
2020/0202313 A1* 6/2020 Eidam .................... A61B 5/117
2021/0004802 A1* 1/2021 Rule ....................... G06F 18/22
2021/0004806 A1 1/2021 Noe
2021/0272098 A1 9/2021 Delsuc
2021/0304189 A1 9/2021 Gupta
2021/0383360 A1 12/2021 Sinha
2021/0406869 A1 12/2021 Pathrabe
2022/0114581 A1 4/2022 Upadhye
2022/0284416 A1 9/2022 Rule
2022/0309509 A1 9/2022 Akgun
2022/0335412 A1 10/2022 Rule
2022/0366410 A1 11/2022 Rule
2022/0398566 A1 12/2022 Rule
2022/0414648 A1 12/2022 Rule
2023/0054157 A1 2/2023 Mao
2023/0065163 A1 3/2023 Vargas
2023/0083785 A1 3/2023 Maiman
2023/0169505 A1 6/2023 Rule
2023/0354020 A1 11/2023 Rule
2023/0359839 A1 11/2023 Lovgren

FOREIGN PATENT DOCUMENTS

CN 111311755 A 6/2020
GB 2516861 A 2/2015
GB 2551907 A 1/2018
JP 2022541601 9/2022
KR 20150140132 A 12/2015
WO 9910824 A1 3/1999
WO 0049586 A1 8/2000
WO 2013155562 A1 10/2013
WO 2015183818 A1 12/2015
WO 2016044859 A1 3/2016
WO 2017047855 A1 3/2017
WO 2019022585 A1 1/2019
WO 2020120849 A1 6/2020
WO 2020154600 A1 7/2020
WO 2021051884 A1 3/2021
WO 2021133492 A1 7/2021
WO 2022108959 A1 5/2022
WO 2022187350 A1 9/2022
WO 2023017943 A1 2/2023
WO 2023064063 A1 4/2023

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

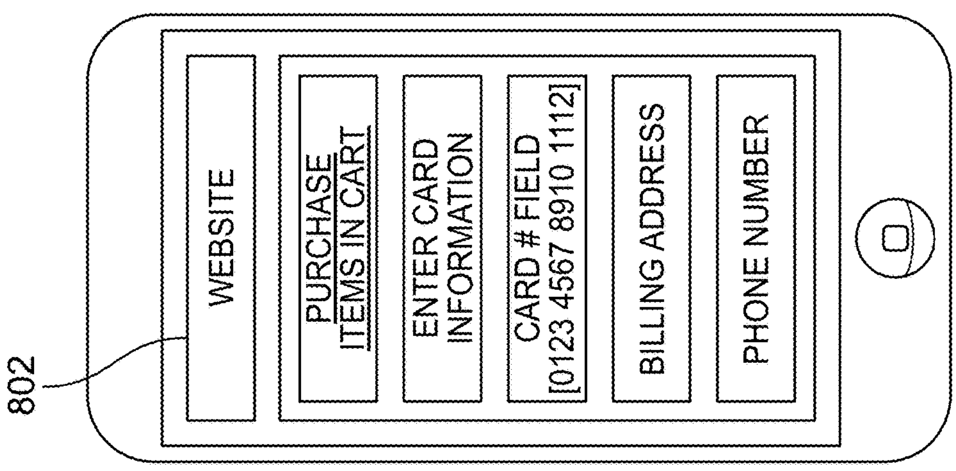
FIG. 8
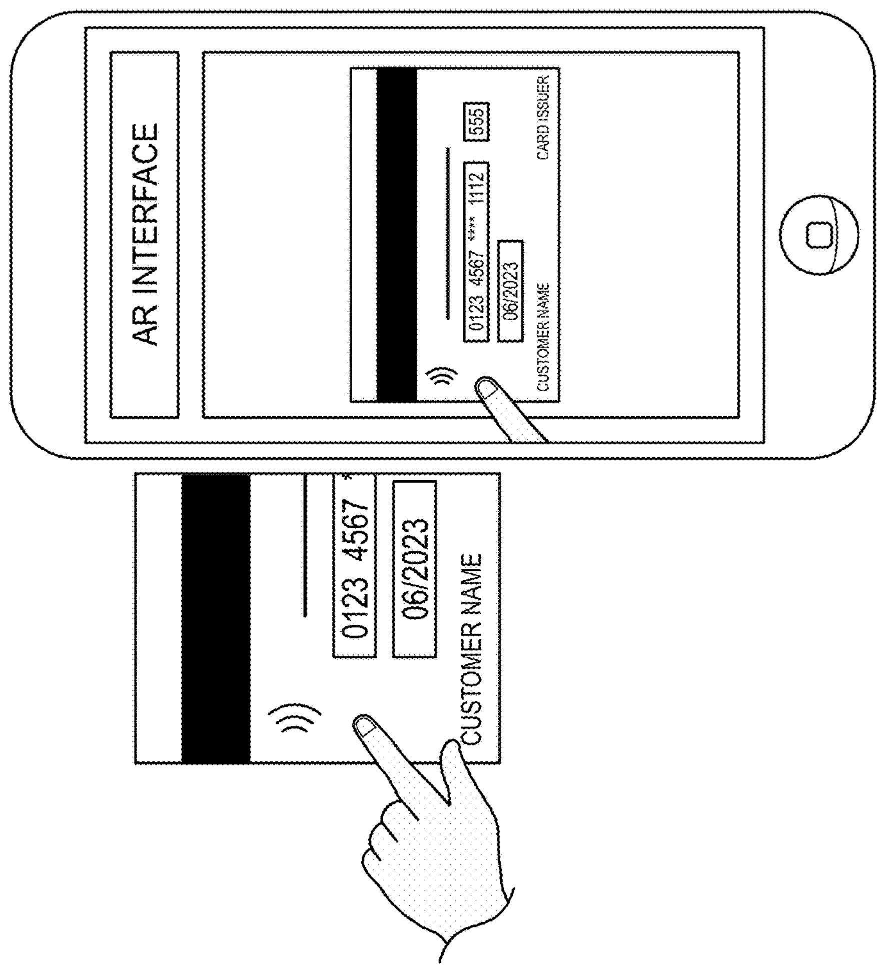

AUGMENTED REALITY INFORMATION DISPLAY AND INTERACTION VIA NFC BASED AUTHENTICATION

CROSS-REFERENCE TO RELATED APPLICATIONS

This application is a continuation of U.S. patent application Ser. No. 18/125,273, filed Mar. 23, 2023, which is a continuation of U.S. patent application Ser. No. 17/342,969, filed Jun. 9, 2021, which is a continuation of U.S. patent application Ser. No. 16/990,300, entitled "AUGMENTED REALITY INFORMATION DISPLAY AND INTERACTION VIA NFC-BASED AUTHENTICATION" filed on Aug. 11, 2020. The contents of the aforementioned application are incorporated herein by reference in their entirety.

BACKGROUND

A primary account number and other types of card information, such as expiration date, card verification value, card provider, etc. may be physically printed onto a card, which can be easily stolen or compromised by fraudsters. For example, card numbers and related information are frequently stolen using cameras at payment terminals. One possible method of thwarting card information theft is to provide a user a card with just the payment instrument (e.g., chip, magnetic stripe) and no printed card information. While this may be a helpful first step, cards without any printed information may be inconvenient for the user in some use cases and should not be the only security measure. Accordingly, there is a need for providing card information in a highly secure and convenient manner.

SUMMARY

Various embodiments are generally directed to improving card security by providing a user a contactless card with no sensitive card information, such as card number, card verification value, and expiration date, printed thereon, and displaying the sensitive card information relative to the card in augmented reality (AR) based on successful NFC-based user authentication. According to examples, the NFC-based user authentication may be performed by one-tapping or single tapping the contactless card to user mobile device. One or more portions of the sensitive card information may be obfuscated to further enhance card security. Moreover, the user can interact with AR elements including the sensitive card information to perform various actions.

BRIEF DESCRIPTION OF THE DRAWINGS

FIG. 8 illustrates an example interaction with AR elements in accordance with one or more embodiments.

DETAILED DESCRIPTION

Figure 1A:
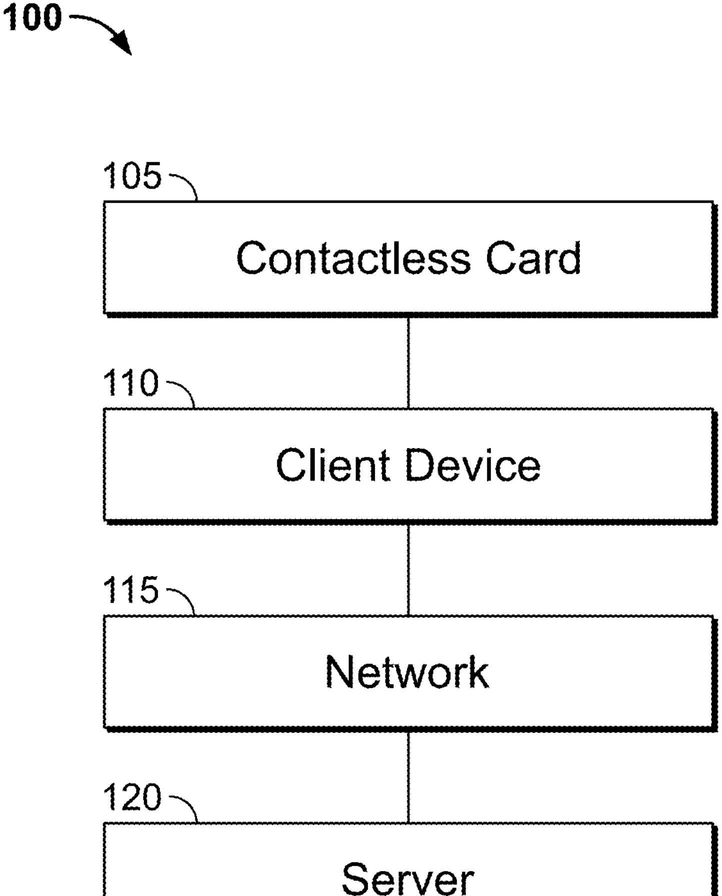
FIG. 1A illustrates an example data transmission system in accordance with one or more embodiments.

Various embodiments are generally directed to improving card security by displaying sensitive card information (e.g., account number, card verification value, expiration date) on a client device (e.g., smartphone) in augmented reality (AR) and allowing a user to interact with such information based on successful NFC-based user authentication. In examples, the user authentication may be performed by "tapping" a contactless card belonging to the user to the client device. A single tap of the contactless card by the user may be configured to perform various actions, one of which may be user authentication. As will be further described in detail below, this may be referred to as "one-tap" or "single tap" authentication and is a highly secure way of verifying user identity to ensure, for example, that it is the authorized user who is actually using the card and not a fraudster. It may be understood that the term "tap," "tapping," or "tapped" may broadly be referred to as brining the contactless card physically close to a computing device (e.g., client device) such that the NFC reader coil of the device can read or receive data from the card.

According to embodiments, one-tap or single tap user authentication involves the user tapping the user's contactless card to the user's client device, which allows near-field communication (NFC) to be established between the client device and the contactless card. Using NFC, the client device may receive one or more cryptograms from the card. The cryptogram(s) may contain encrypted information related to the identity of the authorized user(s) of the contactless card, such as a unique customer identifier or any other suitable information indicating at least that the card belongs to a particular authorized user. In some examples, the information in the one or more cryptograms may be decrypted at the client device using at least one diversified key and the decrypted information may be matched against authentication information (e.g., customer identifier) stored on the client device. In other examples, the received cryptograms may be sent to one or more remote servers (e.g., authentication servers), which may decrypt the cryptogram information and match it against user authentication information (e.g., customer identifier) stored at the remote servers or databases. In either examples, a match between the decrypted information and the authentication information produces a successful NFC-based user authentication.

Upon successfully authenticating the user, sensitive card information can be displayed in AR. In examples, the user may hold the card in front of a camera of the client device and a display interface of the client device may digitally superimpose, overlay, or augment the card information on the card via the display interface. In further examples, the card may be issued to the user without any sensitive card information printed thereon. Moreover, the card may be the contactless card used to authenticate the user. In one embodiment, successful authentication may automatically open the display interface and instruct the user to place the card in front of the camera. Instructions may be displayed until the card is detected. In a further embodiment, successful authentication may automatically open and log the user in to a mobile application (otherwise referred to as "mobile app") where the user is provided more features and customizability with respect to the AR experience.

According to examples, the sensitive card information may be displayed in AR such that it is overlaid on the card itself, e.g., as if the information was originally printed onto the card. In other examples, the card information may be displayed adjacent to card. Some of the sensitive card information (e.g., card number) may be displayed in AR with respect to the front of the card and other information (e.g., card verification value) may be displayed in AR with respect to the back of the card. In some examples, additional layers of security may be added by obfuscating some of the AR displayed information with symbols or characters (e.g., X, *, #). For instance, if the card number "xxxx-xxxx-xxxx-1234" is displayed, the user may select the number, which would prompt the user to provide additional verification information (e.g., alphanumeric password, PIN, biometric password, voice recognition, etc.) to reveal the hidden numbers. The added layer of security may be configured or adjusted via the mobile app.

Moreover, the AR displayed information may be configured such that it is selectable or interactable by the user. For example, the user can configure a selection of the displayed card number to be an automatic copy function so that the card number can be pasted to a card number field of a website. In another, the user can configure a selection of the card number to be an automatic redirect to a landing page of the mobile app for managing the card account and setting or configuring card-related features. Further, a selection of the card verification value may be configured to be a request by the user to the card provider to change the verification value, which can be coordinated between the mobile app and one or more backend computing devices maintaining such information.

In previous solutions, card security was only as strong as the user's ability to limit card visibility during use at payment terminals, which is increasingly more difficult to do with the proliferation of image capturing devices. The embodiments and examples described and set forth herein are advantageous over the previous solutions in numerous ways. For instance, a card may be issued to the user free of any sensitive card information, such as card number, card verification value, expiration date, and the like, printed thereon. Thus, when the card is utilized at a payment terminal, no sensitive information can be stolen by nearby fraudsters. When the user desires to see or access the sensitive information, however, it can be done so via AR only upon successful NFC-based user authentication, which still gives the user familiarity of conventional cards. Further, the AR displayed information may be partially or completely obfuscated, encrypted, or otherwise hidden, which can be revealed with the input of additional verification information. Accordingly, the numerous layers of authentication and verification and the selective viewing of sensitive card information significantly improves card security.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
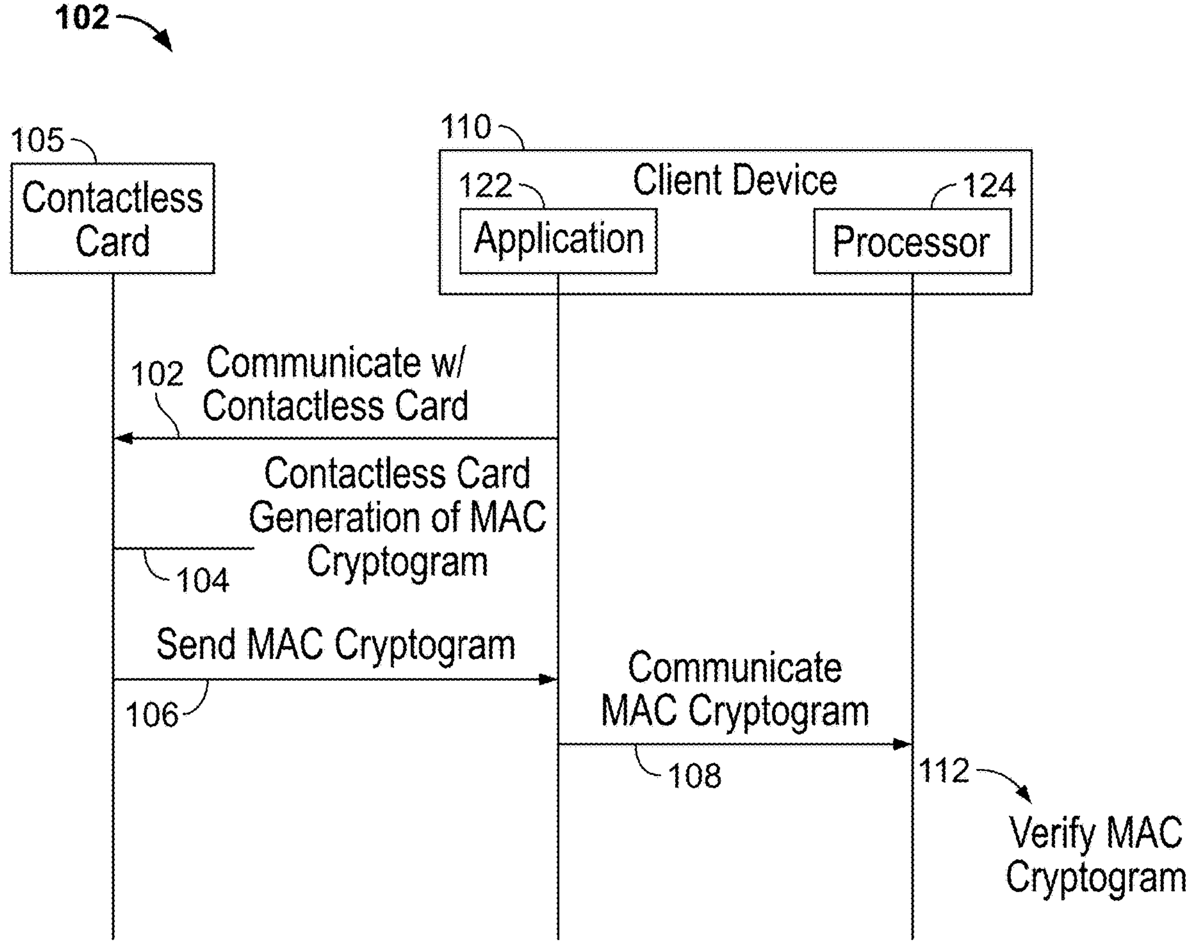
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
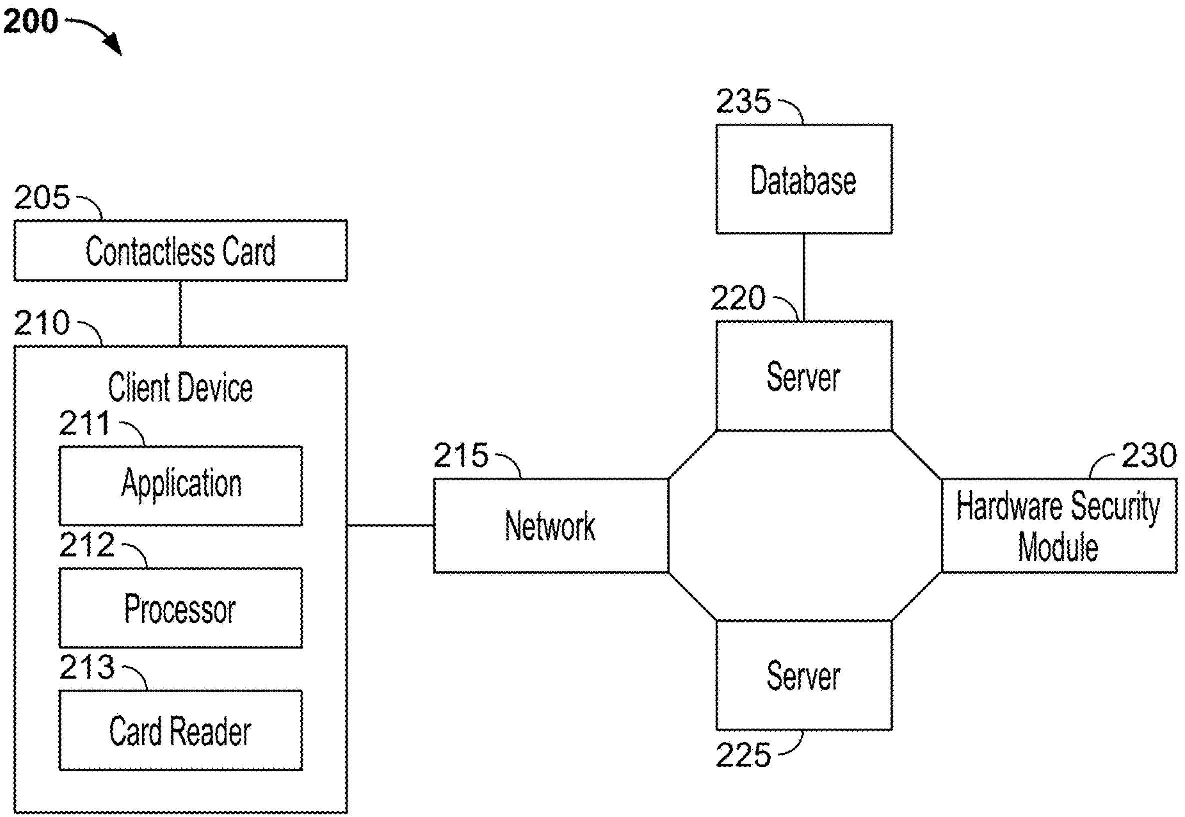
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC-based communication, cellular network between client device 210 and a carrier, and Internet between the carrier and a backend.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
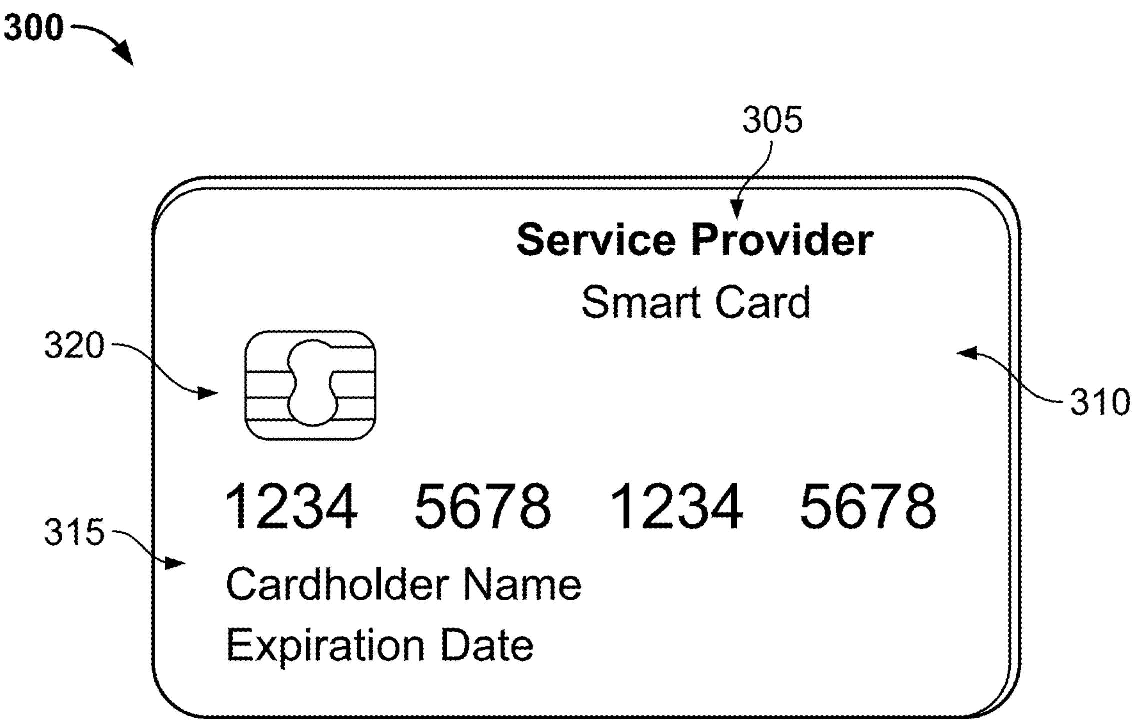
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
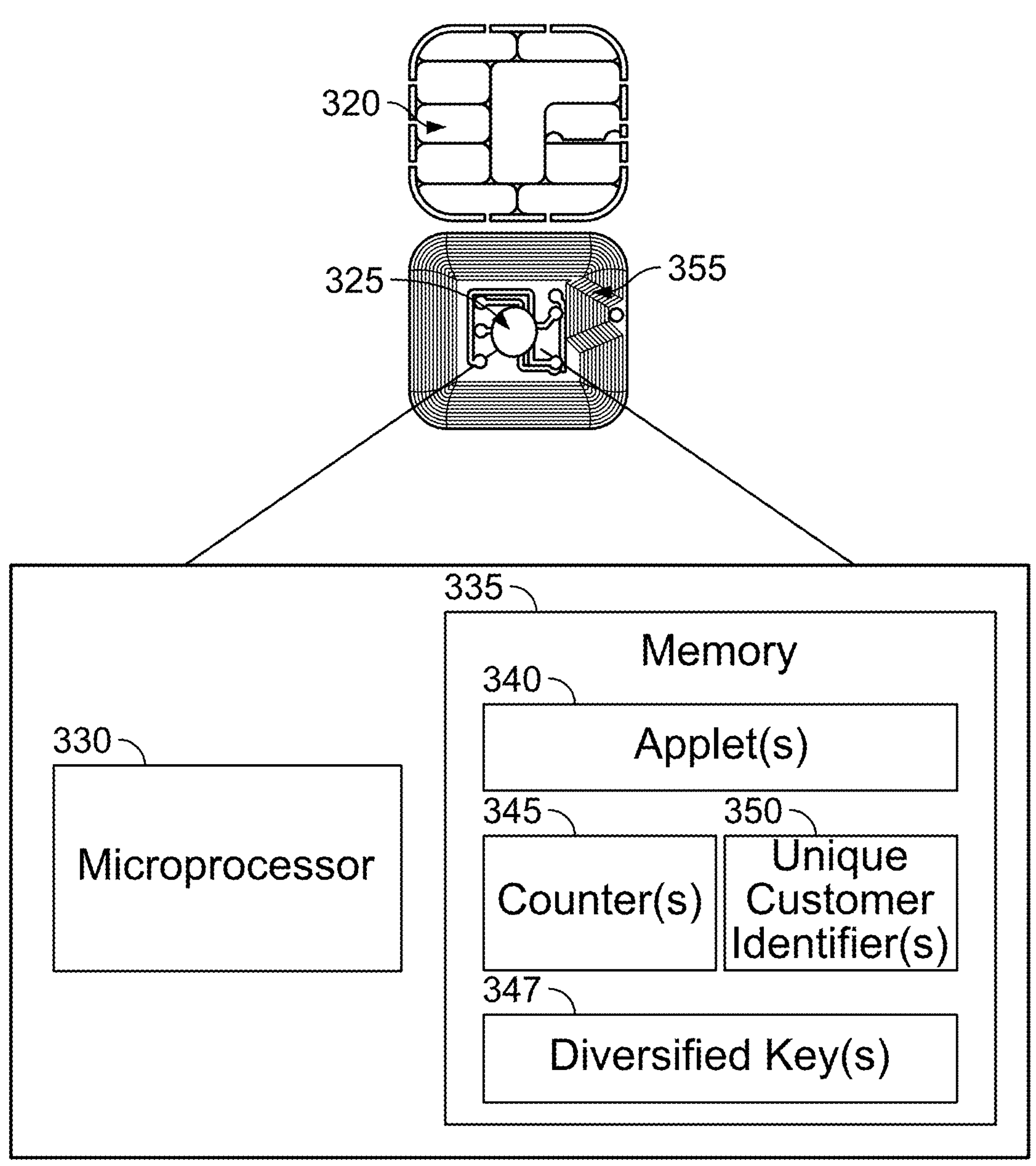
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, one or more diversified keys 347, one or more customer identifiers 350, and other types of suitable data or information. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which may also be stored on the card 300 and produces a diversified key as output, which may be one of the diversified keys 347. It is understood that the master key and the counter value is also securely stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
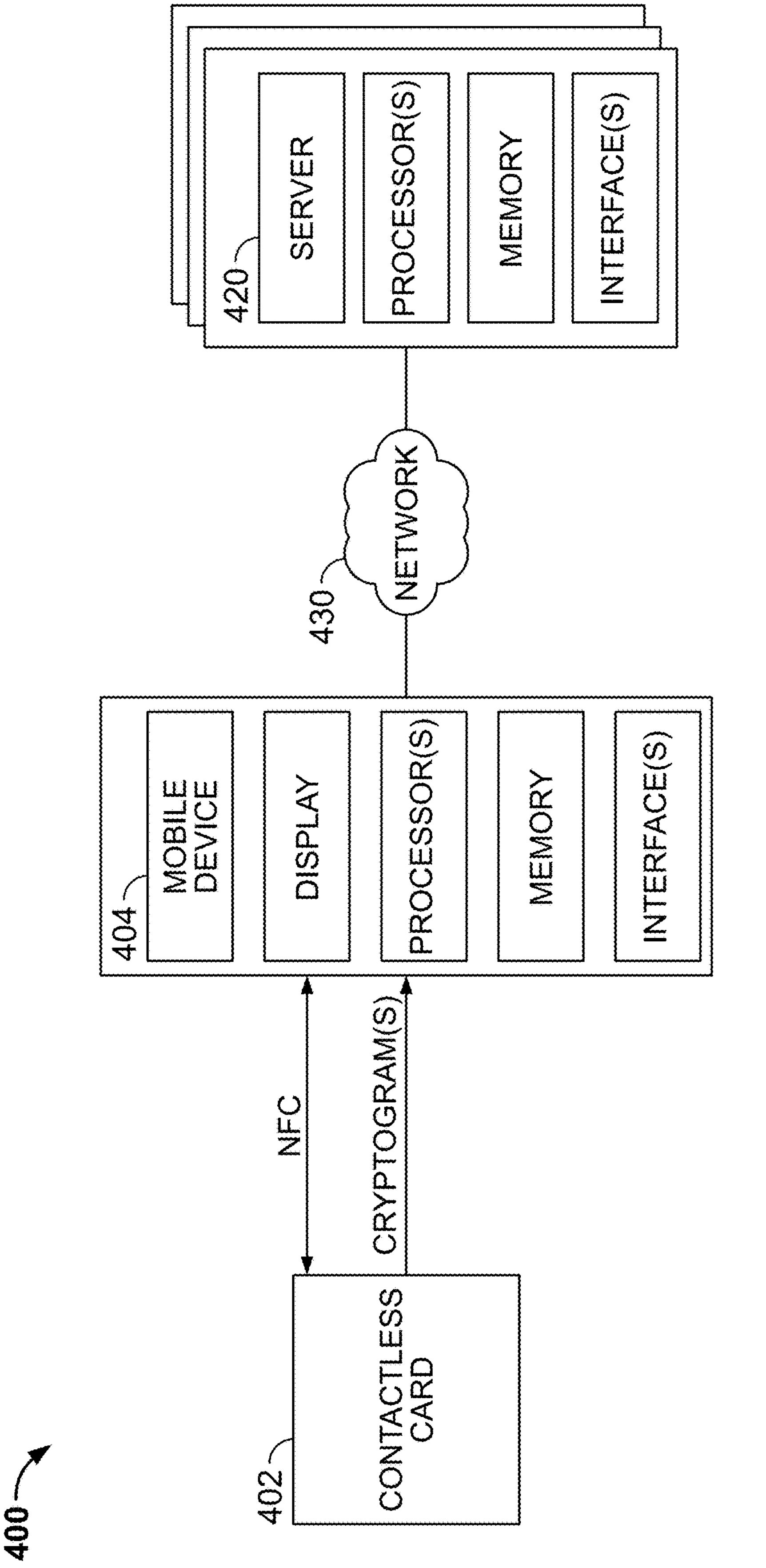
FIG. 4 illustrates an example of NFC-based user authentication in accordance with one or more embodiments.

FIG. 4 illustrates an example of NFC-based user authentication 400 according to one or more embodiments. As described above, sensitive card information cannot be AR-displayed on a mobile device unless the user requesting such display has been properly authenticated. For example, the NFC-based user authentication 400 may be performed by one-tapping or single tapping the contactless card to the mobile device, e.g., which may otherwise be known as one-tap or single tap user or contactless card authentication.

In examples, a user of contactless card 402 may configure a single tap of the card to perform various actions, one of which can be automatic user authentication. One-tap or single tap user authentication may be useful or convenient in various use-cases, such as the user needing to quickly and securely access a particular program, function, service, card-related feature, etc. without having to manually enter username and password every instance, such as automatically logging in to and opening a mobile app (e.g., banking app) or automatically displaying sensitive card information in AR, which will be further described in detail below.

In embodiments, the configuration of the single tap or one tap of the contactless card 402 may be set by the user via a banking app on mobile device 404 (e.g., smartphone, tablet, any portable computing device). For instance, the user may first open the mobile app and login to the user's account by providing single sign-on identifier (SSOID) information, such as a username, email, password, PIN, etc. Before the single tap or one-tap of the card can be configured via the banking app, the user may be required to authenticate the contactless card 402 by tapping the card to the mobile device 404 so as to verify that the contactless card 402 actually belongs to the user and that the user is indeed an authorized user.

In examples, the user may tap the contactless card 402 to the mobile device 404. When tapped, NFC may be established between the contactless card 402 and the mobile device 404. The card 402 may send one or more cryptograms to the mobile device 404 via NFC. It may be understood that tapping the contactless card 402 to the mobile device 404 may broadly refer to the card being in sufficient or requisite proximity to the mobile device 404 such that at least one NFC reader coil of the mobile device 404 is able to communicate (e.g., read or receive data) with the card 402 and/or is able to cause the card 402 to send data to the mobile device 404.

As described above, the one or more cryptograms may be sent as NDEF message(s) and contain encrypted information, such as a customer identifiers (e.g., customer identifier 350). For instance, the customer identifier may be a unique alphanumeric identifier assigned to the authorized user of the contactless card 402 and used to distinguish the user from other contactless card users. It may be understood that the customer identifier stored in the card may be generated when the card 402 is created and the identifier may be also stored, for instance, in a backend customer database of the card provider.

According to examples, when the mobile device 404 receives the one or more cryptograms from the contactless card 402, card authentication may be performed in at least two ways. In one example, the encrypted customer identifier in the received one or more cryptograms may be securely decrypted at the mobile device 404 and the customer identifier may then be matched against user information. In another example, the received one or more cryptograms may be sent to and decrypted at one or more servers 420 (e.g., backend servers, authentication servers, cloud-based servers), which may be remote and located on the backend, provider-side of the network. The servers 420 may then securely decrypt the customer identifier and match it against user information. If the user information does not include a customer identifier associated with the user performing the card authentication, further information on the decrypted customer identifier may be obtained that can be matched against the user information.

User information may broadly be understood to mean any information that is verifiably associated with or traced to the user logged in to the user account via the mobile app, e.g., customer identifier, SSOID, legal name, nickname, date of birth, social security number, phone number, address, or any other information provided by the user to the card provider when establishing the user account (online or otherwise).

In the example of decrypting the cryptogram(s) at the mobile device 404, a diversified key that was used to crypt the information in the one or more cryptograms may be used to perform decryption, as described above. User information may be obtained from the one or more servers 420 via network 430 by request or otherwise. For instance, the obtained user information may include the customer identifier associated with the logged-in user. If that customer identifier matches the decrypted customer identifier from the one or more cryptograms, then authentication of card 402 is successful. If there is a mismatch, it may be determined that the contactless card 402 does not belong or authorized to the user performing the card authentication via the user's account through the mobile app, at which point, for instance, the user's account can be locked for further analysis. In further examples, if the customer identifier associated with the logged-in user is not provided in the obtained user information, the mobile app may request the server(s) 420 to provide further information on the decrypted customer identifier, such as user's legal name, date of birth, SSN, etc. If any of this further information matches any information in the obtain user information, then successful authentication of the card 402 can be confirmed.

The contactless card 402 may be authenticated at the one or more servers 420 in a similar manner, with the exception of the server(s) 420 obtaining the user information associated with the logged-in user and/or further information on the decrypted customer identifier by querying or searching customer databases. The one or more cryptograms may be decrypted by the one or more servers 420 also in a similar manner, e.g., via the diversified key that was used to encrypt the information in the cryptograms including the customer identifier. The one or more servers 420 may have access to numerous types of backend databases and other authentication-based data stores or services.

Once the contactless card 402 has been properly authenticated, the user may configure the single tap or one-tap of the card 402 to function as single tap or one-tap card authentication. In some embodiments, the user may link or associate a subsequent action to a successful authentication, such as automatic AR display of sensitive card information, as will be further described below, automatic access to user's account via the mobile app, automatic one-time card payment, etc.

In examples, the customer identifier stored in the contactless card 402 may be securely stored on the mobile device 404 upon successful card authentication for easy matching when one tap is performed. Thus, after the one-tap configurations have bene set, when the contactless card 402 is again tapped to the mobile device 404, the mobile device can decrypt the customer identifier received in the cryptogram(s) and match it against the customer identifier already securely stored in memory of the mobile device 402 for rapid authentication. If the one-tap or single tap user authentication is processed at the one or more servers 420, the server may be aware of the one-tap configuration set by the user for the user account, and thus, when a decrypted customer identifier associated with that user account is received, user authentication can be quickly confirmed by the server(s) 420. To at least that end, the user can perform one-tap or single tap user authentication only via contactless card 402, e.g., the physical card 402 itself may now be the primary authentication instrument.

It may be understood that, in some examples, the above-described single tap or one-tap configuration may involve the user "opening" the mobile app on the mobile device 404 so that mobile device can connect to the server(s) 420 but not having to login as conventionally required. In at least that way, the user can advantageously perform various card-related actions using a single tap of the card without having to login to the user's account every time. Moreover, by opening the mobile app to utilize the one-tap functionality, the user may be saved from the annoyance or inconvenience of inadvertent card-related actions caused by inadvertent taps of the card to the mobile device. In other examples, the user can configure multiple, consecutive single taps of the card to perform consecutive actions, e.g., where a first tap automatically logs the user in to the mobile app (such as in instances where logging in to the mobile app is first required) and a second tap automatically opens an AR interface for displaying sensitive card information in AR.

Figures 5A, 5B:
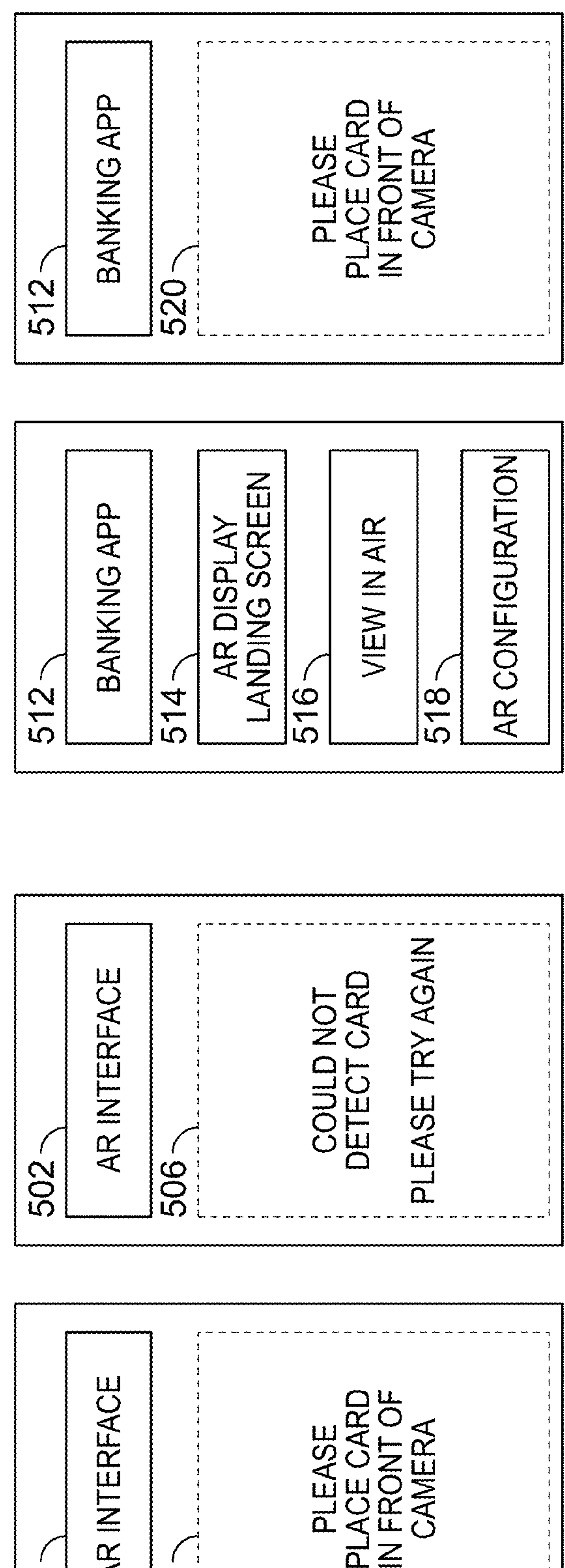
FIG. 5A illustrates an example augmented reality interface in accordance with one or more embodiments.
FIG. 5B illustrates an example of automatic mobile app launch for accessing an augmented reality interface in accordance with one or more embodiments.

FIG. 5A illustrates an example AR interface 502 according to one or more embodiments. As described above, one-tap or a single tap of the user's contactless card may be configured to automatically perform NFC-based user authentication. Upon successful user authentication, the user mobile device may be configured to automatically open an AR interface 502 for displaying in AR sensitive card information associated with the contactless card.

When the AR interface 502 is opened, instruction text 504 may be displayed within a AR display boundary (indicated by the dashed box), which may instruct the user to "Please Place Card in Front of Camera," as shown. The user may then place either the front or back of the contactless in front of the camera of the mobile device to view sensitive card information. If the camera cannot detect the card or if the card is otherwise obscured, further instruction text 506 may be displayed, which can read "Could Not Detect Please Try Again." Advantageously, with a single tap of the contactless card, user authentication and access to the AR interface 502 can be performed in a smooth and efficient manner.

FIG. 5B illustrates an example of automatic mobile app launch 522 for accessing an AR interface according to one or more embodiments. According to embodiments, the user mobile device may be configured to automatically login and open banking app 512 upon successful one-tap NFC-based user authentication. In examples, accessing the banking app 512 may allow additional AR-based features not normally available in the "quick-launch" AR interface 502 illustrated in FIG. 5A. As shown, the banking app 512 may display an AR display landing screen 514, a "view in AR" icon 516, and an "AR configuration" icon 518.

The AR configuration icon 518, when selected, allows the user to configure various actions and features associated with the AR display of sensitive information. As will be further described below, for example, the user can customize the AR display such that only a portion of the card number is displayed while the remaining portion is obfuscated by characters or symbols. In examples, the user may set a separate password, PIN, etc. for revealing the obfuscated portions. Moreover, the font, color, the display location of AR elements may also be configured. Additionally, by way of the banking app 512, the user may be provided the option to view in AR sensitive card information for other customer cards associated with the user account.

When the user selects the view in AR icon 516, the banking app 512 may open an AR interface, similar to the AR interface 502 of FIG. 5A. As shown, instruction text 520 may be displayed to instruct the user to place the card in front of the camera of the mobile device.

Figure 6:
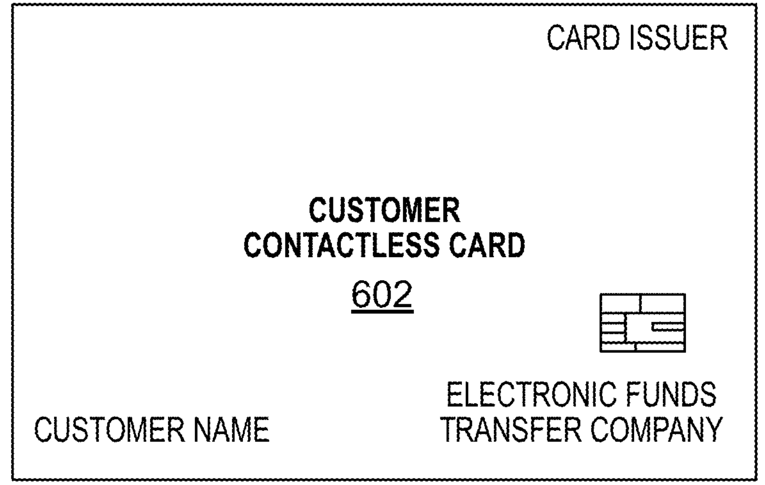
FIG. 6 illustrates an example customer contactless card without any printed sensitive information in accordance with one or more embodiments.
Figure 6:
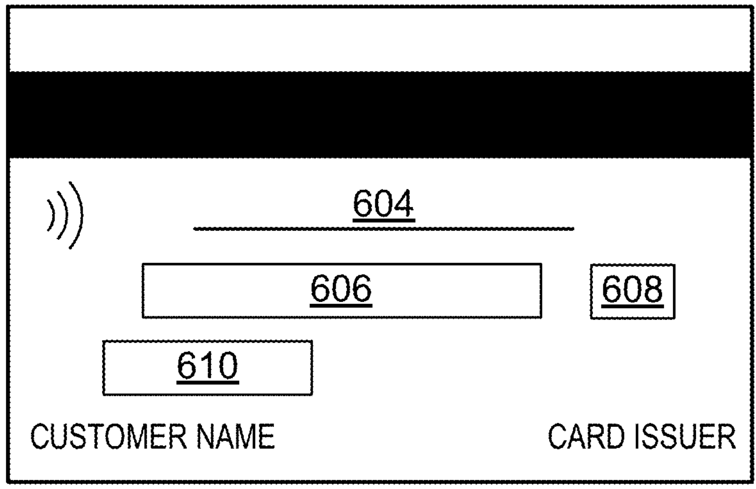

FIG. 6 illustrates an example customer contactless card 602 (front and back) having no sensitive information printed thereon according to one or more embodiments. As shown, the front of the card may include at least a customer name (e.g., user name) at the bottom left-hand corner, a name of the card issuer (e.g., bank) at the top right-hand corner, and a name of the electronic funds transfer company at the bottom right-hand corner. Moreover, the front of the card 602 may include a contact pad or any other suitable integrated circuit (IC) chip. It may be understood that other types of non-sensitive information may be included on the front of the card 602, such as images, graphics, corporate logos, etc.

As further shown, the back of the card may include the customer name at the bottom left-hand side and the name of the card issuer at the bottom right-hand side. The back side of the card 602 may also include a magnetic strip for swipe-based transactions. The customer contactless card 602 may also include a symbol indicating that the card is contactless and enabled for contactless transactions. Further, the backside may include a user signature line 604, and at least three separate empty boxes 606, 608, and 610. Box 606 may outline where the card number can be displayed in AR via the AR interface. Box 608 may outline where the card verification value (CVV) can be displayed in AR. Box 610 may outline where the expiration date can be displayed in AR. It may be understood that the boxes may be included for purposes of convenience and not required.

As set forth above, sensitive card information may broadly refer to any information associated with the card that is susceptible to theft, such as the card number (e.g., primary account number), CVV, expiration date, etc.

Figure 7:
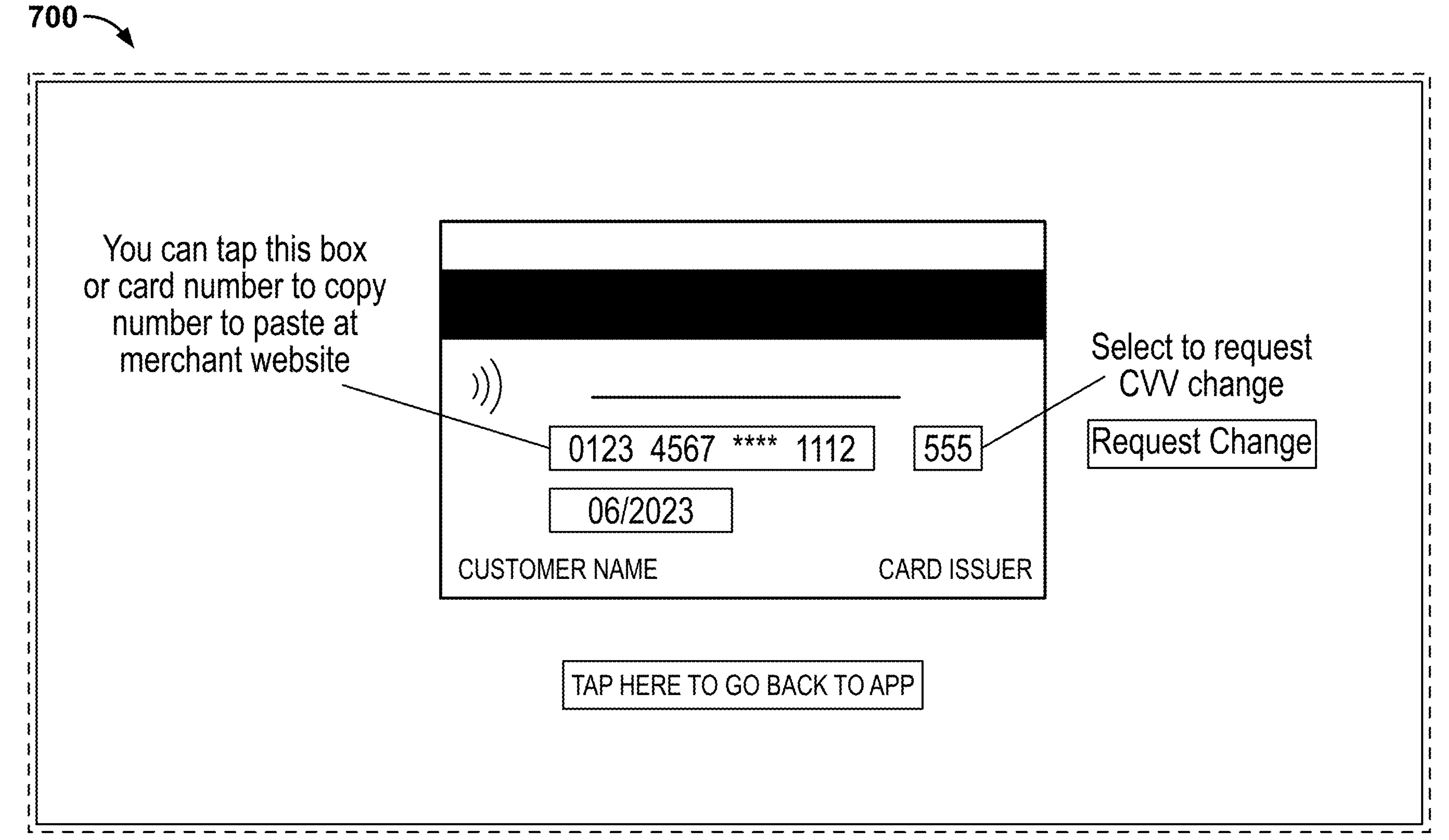
FIG. 7 illustrates an example of sensitive information displayed in AR via an AR interface in accordance with one or more embodiments.

FIG. 7 illustrates an example of sensitive card information displayed in AR via AR interface 700 according to one or more embodiments. For ease of explanation, the customer contactless card 602 of FIG. 6 is shown in FIG. 7 and will be used to describe the AR display of the sensitive information.

For example, the user may hold the contactless card 602 in front of the camera of the user's mobile device, where the backside of the card is facing camera forward. As shown, the card number, the CVV, and the expiration date may all be superimposed on the card in AR respectively in boxes 606, 608, and 610. The card number "0123 4567 ** 1112" may be displayed in box 606, for instance, in a font and color that is easily readable by the user. The CVV and the expiration date can similarly be displayed in boxes 608 and 610** in an easily readable manner.

As further shown and as described above, one or more portions of sensitive information, such as the card number, may be obfuscated to add additional layers of security. To reveal the hidden numbers, the user may select the obfuscated portion, which may prompt the user to enter verification information, such as a PIN, password, etc. If the entered verification information is correct, then the hidden numbers may be revealed and displayed in AR similar to the other portions of the number that were not obfuscated. In examples, obfuscation may be configured by the user in the mobile app, such as which types of sensitive information to obfuscate, which portions thereof to obfuscate, setting up the mechanisms for revealing the hidden portions (setting up PIN, password, etc.) and other related features. In addition to the highly secure NFC-based user authentication performed by the user, as set forth above, obfuscation of portions of the sensitive information displayed in AR may further improve overall card security, e.g., in instances where a fraudster is able to see the AR displayed information on the user mobile device.

As further shown, various types of callouts may also be displayed in AR in the AR interface 700 pertaining to the AR elements. For example, a callout related to the card number may be displayed to indicate to the user "You can tap this box or card number to copy number to paste at merchant website," which will be further described in detail below. In another example, a callout related to the CVV number may be displayed to indicate that the user can select the "request change" icon to change the CVV number, e.g., if the user desires to "roll" the CVV number after a predetermined period of time. The interface 700 may also display other selectable icons anywhere on the interface, such as the "tap here to go back to app" icon, which may transition the interface back to the bank app interface.

It may be understood that while the backside of the card is shown and described in FIG. 7, the sensitive card information may be displayed on any side of the card. Further, since the user may view the sensitive card information in AR from different angles and at different positions on the mobile device, it may be understood that the AR interface may perform automatic scaling or scale-to-fit procedures such that the sensitive information remains displayed in their respective and correct positions relative to the card 602 regardless of the differing viewing angles or positions.

In examples, the AR experience may be advantageously enhanced by configuring the AR interface to seamlessly transition the AR display of various information as the user flips the customer card 602 from the front-side to the backside or vice versa. In at least that regard, the user may be able to enjoy an enhanced interactive AR experience. Augmented reality, or AR, as used herein may broadly refer to an interactive experience of a real-world environment where the objects that reside in the real world are enhanced by computer-generated perceptual information, sometimes across multiple sensory modalities, including visual, auditory, haptic, somatosensory, olfactory, etc.

FIG. 8 illustrates an example user interaction 800 with AR elements according to one or more embodiments. For ease of explanation, the AR elements described above with respect to FIG. 7 will be used to describe the user interaction 800.

As shown, the user may interact with one or more interactable or selectable AR elements displayed via the AR interface. For example, the user may select, by tapping or selecting with the user's finger, the AR element (e.g., the superimposed card number, the box 606, or any virtual element or otherwise indicating that the user is selecting the card number). Once selected, the user's interaction with the AR element may cause a particular action, such as copying the card number to a digital clipboard or the like to paste or otherwise use the card number at a merchant website. Thus, as illustrated, the copied card number may then be pasted to the "card #field" of the website 802 via the mobile device to make the online transaction experience more convenient for the user. In other examples, selection of the AR element associated with the card number may allow the user to automatically process recurring purchases (e.g., subscriptions).

Although now shown, other actions, such as requesting a CVV change, may be possible by selecting a different AR element. The user may press or select the CVV number on the card or box 608 or the request change icon to process such request. It may be understood that, in some example, the AR element(s) and associated action(s) may be configurable by the user via the banking app.

Figure 9:
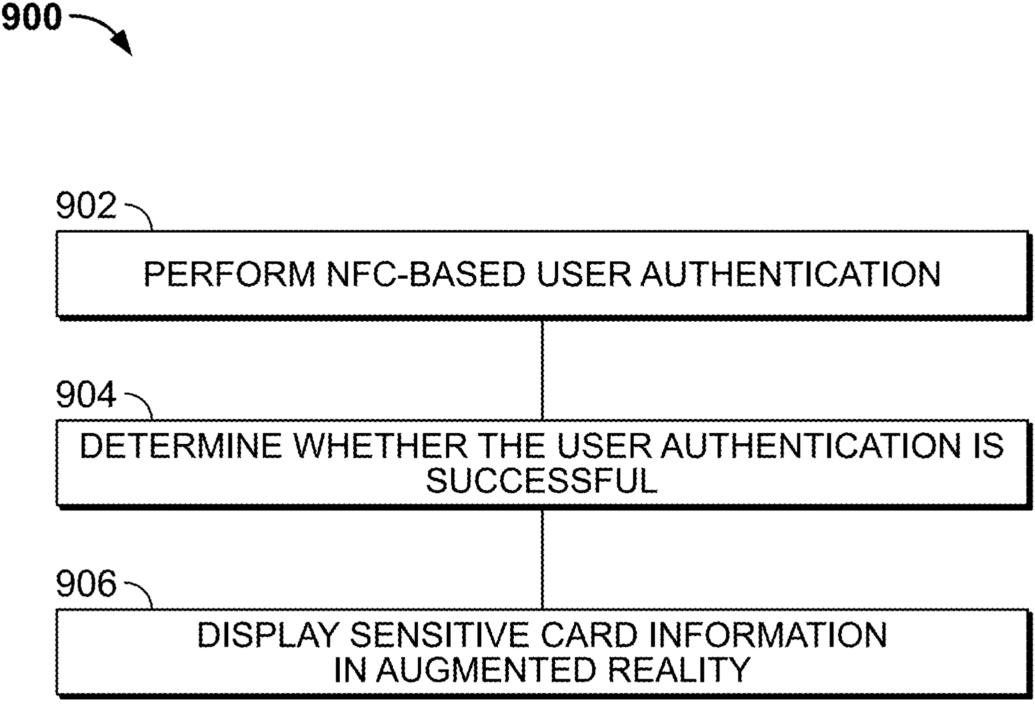
FIG. 9 illustrates an example flow diagram in accordance with one or more embodiments.

FIG. 9 illustrates an example flow diagram 900 according to one or more embodiments. The flow diagram 900 is related to providing a user an augmented reality display of sensitive card information based on successful NFC-based user authentication. It may be understood that the blocks of the flow diagram 900 and the features described therein are not required to be performed in any particular order. Moreover, it may be understood that the flow diagram 900 and the features described therein may be executed by one or more processors or any suitable computing device or computing architecture described herein.

At block 902, NFC-based user authentication may be performed to allow AR display of sensitive card information to a user. The NFC-based user authentication, as described above, may be performed by one tapping or single tapping a contactless card to a mobile device. When the contactless card is tapped to or otherwise brought near the mobile device, the mobile device may detect the presence of the contactless via NFC. The NFC communication may allow the contactless card to send one or more cryptograms to the mobile device via the NFC (e.g., via NDEF messages). Information in the one or more cryptograms, such as a customer identifier, may be encrypted with a diversified key.

When the mobile device receives the one or more cryptograms, information contained therein can be decrypted in at least two ways. In one example, the mobile device itself may be configured to decrypt the information via the diversified key used to encrypt the information in the cryptogram (s). In another example, the mobile device may send the one or more cryptograms to remote computing device(s) (e.g., backend servers, authentication servers, cloud-based serves), where the remote computing device(s) can perform the decryption using the diversified key.

Once the information in the cryptogram(s), including the customer identifier, has been decrypted, the customer identifier can be matched against a customer identifier that is verifiably associated with the user. In at least that regard, if the two customer identifiers do not match, it can be determined that the contactless card that the user tapped to the mobile device does not belong to nor authorized for the user.

At block 904, it may be determined whether the user authentication is successful. In examples, successful user authentication may be confirmed if the two above-described customer identifiers match. The positive match may indicate that the contactless card belongs to and is authorized for the user.

At block 906, upon successful NFC-based user authentication, sensitive card information may be displayed in AR via an AR interface. The sensitive information may be superimposed or displayed on the card. In other examples, the information may be AR displayed adjacent to the card. The user may also interact with AR elements to perform certain actions, where the AR elements include the sensitive information. Moreover, to further enhance security, one or more portions of the sensitive information may be obfuscated when displayed in AR. The obfuscated portions can be revealed only if the user enters the correct verification information (e.g., password, PIN, etc.).

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:

a memory to store instructions; and a processor, coupled with the memory, operable to execute the instructions that, when executed, cause the processor to:

receive encrypted data from a contactless card;

receive, from a server, an indication that the server decrypted the encrypted data;

authenticate, based on the indication, a request to display sensitive account information; and display, via an augmented reality (AR) interface based on the authentication, the sensitive account information on the contactless card in AR when the contactless card is detected by a camera, wherein one or more portions of the sensitive account information is obfuscated by one or more characters or symbols.

2. The apparatus of claim 1, wherein the encrypted data is received via near-field communication (NFC), wherein the sensitive account information includes one or more of a card number, a primary account number, a card verification value, or an expiration date.

3. The apparatus of claim 1, the processor operable to execute the instructions that, when executed, cause the processor to:

receive a selection of the one or more obfuscated portions of the sensitive account information;

receive verification information, the verification information comprising a password or a personal identification number;

determine that the verification information is valid; and reveal, based on the determination that the verification information is valid, the selected one or more obfuscated portions of the sensitive account information; and display, via the AR interface, the revealed portions in AR.

4. The apparatus of claim 3, the processor operable to execute the instructions that, when executed, cause the processor to:

display one or more callouts adjacent to the sensitive account information, the one or more callouts comprising information indicating that an AR element associated with the sensitive account information is selectable to perform an action, wherein the AR element is the sensitive account information superimposed on the card, and wherein the action comprises copying the selected information to a digital clipboard.

5. The apparatus of claim 1, wherein the encrypted data is based on a first key, wherein the first key is based on a second key and a counter value.

6. The apparatus of claim 1, the processor operable to execute the instructions that, when executed, cause the processor to, prior to receiving the encrypted data:

download and install an application comprising the AR interface based on a tap of the contactless card to the apparatus.

7. A method, comprising:

decrypting, by a processor of a device, encrypted data from a contactless card;

authenticating, by the processor based on the decryption, a request to display sensitive account information; and displaying, by the device via an augmented reality (AR) interface based on the authentication, the sensitive account information on the contactless card in AR when the contactless card is detected by a camera, wherein one or more portions of the sensitive account information is obfuscated by one or more characters or symbols.

8. The method of claim 7, wherein the sensitive account information includes one or more of a card number, a primary account number, a card verification value, or an expiration date.

9. The method of claim 8, further comprising:

receiving, by the processor, a selection of the one or more obfuscated portions of the sensitive account information;

receiving, by the processor, verification information, the verification information comprising a password or a personal identification number;

determining, by the processor, that the verification information is valid; and revealing, by the processor based on the determination that the verification information is valid, the selected one or more obfuscated portions of the sensitive account information; and displaying, by the processor via the AR interface, the revealed portions in AR.

10. The method of claim 9, further comprising:

displaying, by the processor, one or more callouts adjacent to the sensitive account information, the one or more callouts comprising information indicating that an AR element associated with the sensitive account information is selectable to perform an action, wherein the AR element is the sensitive account information superimposed on the card, and wherein the action comprises copying the selected information to a digital clipboard.

11. The method of claim 7, further comprising prior to authenticating the request:

determining, by the processor, that a first customer identifier yielded by decrypting the encrypted data matches a second customer identifier stored in the device, wherein the request is further authenticated based on the determination that the first and second customer identifiers match.

12. The method of claim 7, further comprising, prior to receiving the encrypted data:

downloading and installing, by the processor, an application comprising the AR interface based on a tap of the contactless card to the device.

13. A non-transitory computer-readable storage medium storing computer-readable program code executable by a processor of a device to cause the processor to:

receive encrypted data from a contactless card;

receive, from a server, an indication that the server decrypted the encrypted data;

authenticate, based on the indication, a request to display sensitive account information; and display, via an augmented reality (AR) interface executing on the processor based on the authentication, the sensitive account information on the contactless card in AR when the contactless card is detected by a camera, wherein one or more portions of the sensitive account information is obfuscated by one or more characters or symbols.

14. The medium of claim 13, wherein the sensitive account information includes one or more of a card number, a primary account number, a card verification value, or an expiration date.

15. The medium of claim 14, storing computer-readable program code executable by the processor to cause the processor to:

receive a selection of the one or more obfuscated portions of the sensitive account information;

receive verification information, the verification information comprising a password or a personal identification number;

determine that the verification information is valid; and reveal, based on the determination that the verification information is valid, the selected one or more obfuscated portions of the sensitive account information; and display, via the AR interface, the revealed portions in AR.

16. The medium of claim 15, storing computer-readable program code executable by the processor to cause the processor to:

display one or more callouts adjacent to the sensitive account information, the one or more callouts comprising information indicating that an AR element associated with the sensitive account information is selectable to perform an action, wherein the AR element is the sensitive account information superimposed on the card, and wherein the action comprises copying the selected information to a digital clipboard.

17. The medium of claim 13, storing computer-readable program code executable by the processor to cause the processor to, prior to authenticating the request:

determine that a first customer identifier yielded by decrypting the encrypted data matches a second customer identifier, wherein the request is further authenticated based on the determination that the first and second customer identifiers match.

18. The medium of claim 17, wherein the encrypted data is based on a first key, wherein the first key is based on a second key and a counter value.

19. The medium of claim 13, storing computer-readable program code executable by the processor to cause the processor to, prior to receiving the encrypted data:

download and install an application comprising the AR interface based on a tap of the contactless card to the device.

* * * * *